United States Patent
Ringer et al.

[11] Patent Number: 5,954,341
[45] Date of Patent: Sep. 21, 1999

[54] BELLOWS SEAL WITH DRIVE COLLAR FOR REVERSE PRESSURE CAPABILITY

[75] Inventors: Yoram Ringer; Fred Rathburn, both of Cranston, R.I.

[73] Assignee: John Crane Sealol Inc., Cranston, R.I.

[*] Notice: This patent issued on a continued prosecution application filed under 37 CFR 1.53(d), and is subject to the twenty year patent term provisions of 35 U.S.C. 154(a)(2).

[21] Appl. No.: 08/895,501

[22] Filed: Jul. 16, 1997

Related U.S. Application Data

[63] Continuation of application No. 08/681,928, Jul. 30, 1996, abandoned.

[51] Int. Cl.[6] .................................................. F16J 15/00
[52] U.S. Cl. ........................ 277/361; 277/387; 277/389; 277/391
[58] Field of Search ................................. 277/65, 82, 83, 277/88, 91, 352, 361, 377, 387, 389, 391

[56] References Cited

U.S. PATENT DOCUMENTS

| | | | |
|---|---|---|---|
| 3,035,841 | 5/1962 | Riester | 277/83 |
| 3,090,627 | 5/1963 | Tankus | 277/65 |
| 3,260,530 | 7/1966 | Jelatis | 277/65 |
| 3,288,474 | 11/1966 | Gitz | 277/88 |
| 4,434,986 | 3/1984 | Warner | 277/65 |
| 4,560,173 | 12/1985 | Adams | 277/65 |
| 4,889,350 | 12/1989 | Tranter | 277/88 |
| 5,443,274 | 8/1995 | Fuse | 277/82 |

OTHER PUBLICATIONS

Sales Brochure for "Type 2800 for Non–Contacting, Dry Running Double Cartridge Seal", John Crane Inc. 6 pages, nominal publication date 1993.

Sales Brochure for "Type 1215 and 2215 Metal Bellows Cartridge Seals," John Crane Inc., 1991.

EG&G Sealol, Inc.—Redacted page from Distributor's Release Illustrating Type 631 Welded Metal Bellows Cartridge Seal Jan. 15, 1996.

EG&G Sealol, Inc. Industrial Division—Drawing No. 0704519 R/S (Rev.A)—Nominal date Jun. 28, 1991, Date of publication of First Use sometime in 1991–1992.

Sales Brochure for "5615 and 5625 Universal Cartridge Metal Bellows Seal" John Crane Inc. Sep. 1996 (Nominal Publication Date).

*Primary Examiner*—Daniel G. DePumpo
*Attorney, Agent, or Firm*—Dorn, McEachran, Jambor & Keating

[57] ABSTRACT

A seal for sealing a low pressure area from a high pressure area for containing a process fluid. The high pressure area is located along a rotatable shaft extending from a machine body. The seal includes an outboard seal positioned along the shaft and an inboard seal axially spaced along the shaft from the outboard seal to define an annular chamber between the inboard seal and the outboard seal for containing a buffer fluid. The inboard seal includes a stationary assembly attached to the machine body and having a stationary seal ring with a stationary sealing face. The inboard seal also includes a rotating assembly attached to the shaft. The rotating assembly includes a rotating seal ring having a rotating sealing face in sealing relation with the stationary sealing face. A drive collar is positioned between the stationary assembly and the machine body to maintain the sealing relation of the rotating and stationary sealing faces when the pressure of the buffer fluid is less than the pressure of the process fluid.

16 Claims, 2 Drawing Sheets

BELLOWS SEAL WITH DRIVE COLLAR FOR REVERSE PRESSURE CAPABILITY

This application is a continuation of application Ser. No. 08/681,928, filed Jul. 30, 1996 now abandoned.

BACKGROUND OF THE INVENTION

1. Field of the Invention

The present invention relates to a seal, and more specifically to a bellows gas seal capable of undergoing a reverse pressure change.

2. Discussion of the Related Art

Pumps, especially those in refineries and chemical plants, often handle difficult-to-seal liquids, including propane, butane, and other unstable, combustible, or toxic liquids. These liquids can cause short seal life and undesirable product leakage, prompting the passage of state health and safety pump emission regulations.

Dry-running gas lubricated seals have been developed and provide significant economic benefits over contact seals. One of the first working examples of a gas type seal was disclosed in U.S. Pat. No. 3,499,653 to Gardner. In that seal, the relatively rotatable sealing members are kept from touching one another during operation, reducing wear and heat due to friction. A gas pressure is created between the seal member faces to separate the faces by forming a thin film of gas between them. Shallow spiral grooves on the outer periphery of one of the seal members cause gas to be forced inward, thus providing sufficient pressure to separate the seal member faces. This type of seal is called a "non-contacting" seal because the sealing faces separate and a thin film of gas forms therebetween during operation. An O-ring is used as a secondary seal, and springs provide a biasing force against the opening of the seal faces and close the gap between the faces when the equipment is not operating.

More recently, gas seals have incorporated bellows as a secondary seal and biasing member. Often, a buffer gas is supplied to a seal at a pressure higher than the process fluid to help prevent leakage of process fluid across the non-contacting sealing faces. Should a sudden drop of buffer gas pressure occur so that the pressure of the process fluid exceeds that of the buffer gas (a so called "pressure reversal"), a non-contacting bellows gas seal may blow open, resulting in high leakage of process fluid into the atmosphere.

SUMMARY OF THE INVENTION

An object of the invention, therefore, is to provide an improved non-contacting bellows gas seal capable of maintaining a sealing relationship between the seal faces upon the occurrence of a pressure reversal. Additional objects and advantages of the invention will be set forth in part in the description which follows, and in part will be obvious from the description, or may be learned by practice of the invention. The objects and advantages of the invention will be realized and attained by way of the elements and combinations particularly pointed out in the appended claims.

To achieve the objects and in accordance with the purpose of the invention, the invention comprises a seal for sealing a low pressure area from a high pressure area for containing a process fluid. The high pressure area is located along a rotatable shaft extending from a machine body. The seal includes an outboard seal positioned along the shaft and an inboard seal axially spaced along the shaft from the outboard seal to define an annular chamber between the inboard seal and the outboard seal for containing a buffer fluid. The inboard seal includes a stationary assembly attached to the machine body and having a stationary seal ring with a stationary sealing face. The inboard seal also includes rotating assembly attached to the shaft. The rotating assembly includes a rotating seal ring having a rotating sealing face in sealing relation with the stationary sealing face. A drive collar is positioned between the stationary assembly and the machine body to maintain the sealing relation of the rotating and stationary sealing faces when the pressure of the buffer fluid is less than the pressure of the process fluid.

According to another aspect, the invention comprises a gas seal including a stationary assembly attached to a machine body and a rotary assembly attached to a rotatable shaft extending from the machine body. The stationary assembly includes a stationary seal ring having a stationary sealing face. The rotary assembly includes a rotating seal ring having a rotating sealing face in sealing relation with the stationary sealing face. A drive collar is positioned between the stationary assembly and the machine body. The drive collar is axially movable depending on a pressure differential of a process fluid to be sealed and a buffer fluid supplied to the seal.

According to a further aspect, the invention comprises a seal for sealing a process fluid. The seal includes a stationary seal ring coupled to a machine body and a rotating seal ring coupled to a rotatable shaft extending from the machine body. The stationary seal ring has a stationary sealing face and a back face opposite from the stationary sealing face. The rotating seal ring has a rotating sealing face in sealing relation with the stationary sealing face. The seal further includes structure which applies a contact force to the back face of the stationary seal ring so that the stationary and rotating sealing faces remain in sealing relation when the pressure of the process fluid is greater than the pressure of a buffer fluid supplied to the seal.

It is to be understood that the foregoing general description and the following detailed description are exemplary and explanatory only and are not restrictive of the invention as claimed.

BRIEF DESCRIPTION OF THE DRAWINGS

The accompanying drawings are included to provide a further understanding of the invention and are incorporated in and constitute part of the specification, illustrate a preferred embodiment of the invention, and, together with a description, serve to explain the principles of the invention.

DETAILED DESCRIPTION OF THE PREFERRED EMBODIMENT

Figure 1:
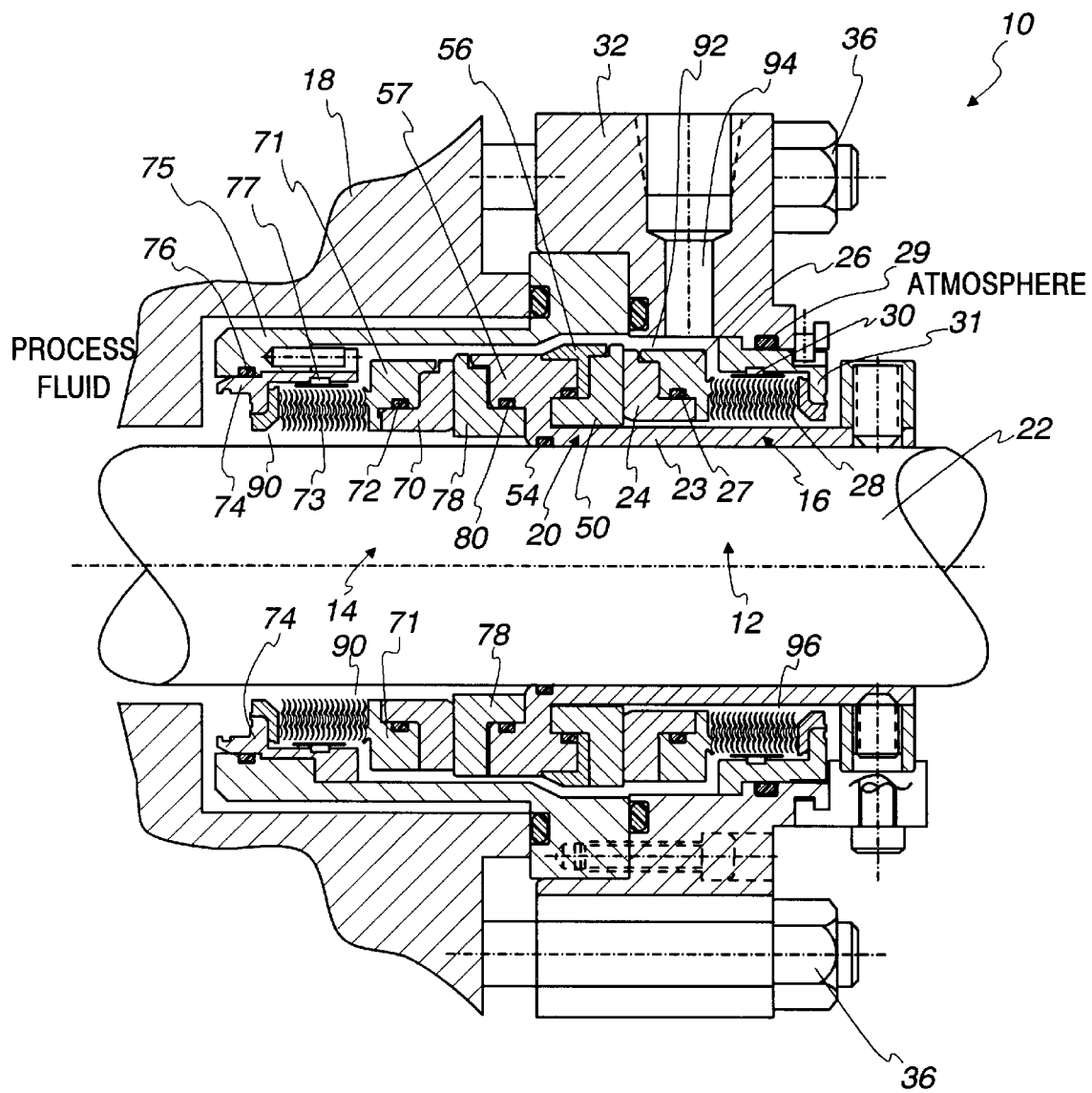
FIG. 1 is a cross-sectional view of an embodiment of a non-contacting bellows seal according to the present invention.

Reference will be made in detail to the present preferred embodiment of the invention, an example of which is illustrated in the accompanying drawings. Like reference numerals refer to like parts in the various figures of the drawings.

The present invention is directed to a gas seal having an inboard non-contacting bellows seal capable of maintaining a sealing relationship between the sealing faces upon the occurrence of a reverse pressure change. The general purpose of such a seal is to seal rotating equipment from leaking an internal process fluid or gas to the atmosphere. The seal is suitable for use in pumps, centrifugal gas compressors, gas or steam turbines, gas expanders, or other industrial applications, and also aerospace applications, including jet engines, turbo compressors, and cryogenics.

The gas seal according to the present invention incorporates an inboard seal and an outboard seal axially separated along a rotating shaft of the equipment to define a chamber therebetween. During normal operation, the chamber accepts a buffer fluid at a pressure exceeding that of the process fluid to separate the sealing faces of the seal rings of both the inboard and outboard seals.

The non-contacting sealing face of the inboard seal is designed with a high hydrostatic balance (approximately 75%) and a relatively wide annular cross-sectional face. The narrower cross-sectional sealing face of the rotating seal ring and the stationary seal ring dictates hydrostatic balance. Hydrostatic balance is the ratio of (a) the annular area of the narrower sealing face from its outer diameter to a bellows mean diameter to (b) the annular area of the sealing face from its inner diameter to the bellows mean diameter. Should a sudden loss of buffer gas pressure occur so that the process fluid pressure exceeds the buffer gas pressure, this design would cause the sealing faces of the inboard seal to open, in the absence of other preventative structure. A large opening of the seal faces would result in leakage of process fluid into the atmosphere.

In light of this seal face design, the seal according to the present invention includes structure to maintain the sealing relationship between the stationary and rotating seal rings of the inboard seal should a pressure reversal occur. More particularly, the seal includes a drive collar positioned between the stationary seal ring and the housing that is axially movable depending on the pressure differential between the process fluid and the buffer fluid. During normal operation, when the pressure of the buffer fluid exceeds that of the process fluid, the drive collar is retained away from the seal rings and against a gland connected to the housing. During reverse pressure conditions, process fluid pressure forces the drive collar to move axially towards the seal rings, contact the back face of the stationary seal ring, and force the seal rings to maintain a sealing relationship.

An embodiment of a seal according to the present invention is shown in FIG. 1 and denoted generally by reference numeral 10. Seal 10 includes an outboard non-contacting gas seal 12 and an inboard non-contacting gas seal 14. The non-contacting seal 12 consists of a stationary assembly 16 attached to a machine body 18 and a rotary assembly 20 attached to a rotary shaft 22 mounted within a sleeve 23.

Stationary assembly 16 includes a stationary seal ring 24, a seal ring shell 26, O-ring secondary seals 27 and 29, a bellows 28, a damper strip 30, an adaptive end fitting 31, and an adaptive housing 32. All of these components are annular.

Stationary seal ring 24 is preferably made of chemical grade carbon and includes a stator sealing face facing the inboard side. O-rings 27 and 29 preferably consist of synthetic rubber and provide a secondary seal. Adaptive housing 32 is designed as required for proper installation onto particular equipment. Preferably, a plurality of socket head cap screws 36 or other suitable fasteners attach housing 32 to machine body 18.

Bellows 28 is a flexible member preferably welded to ring shell 26. Bellows 28 acts as both a flexible member and a dynamic secondary seal. Bellows 28 flexes to accommodate axial motion and runout. (Runout is the angular misalignment of the rotating seal ring with respect to the shaft axis.) Bellows 28 preferably consists of individual thin metal plates, each approximately 0.12 to 0.20 millimeters in thickness, with male and female fittings for proper nesting within one another. During operation, bellows 28 is prone to vibration. To prevent fatigue failure of bellows 28, damper strip 30 provides frictional damping. The ring-shaped damper strip 30 preferably consists of metal.

Rotary assembly 20 of seal 12 includes a rotating seal ring 50, an O-ring secondary seal 54, and a rotor adapter 56 seated within a flange portion 57 of sleeve 23. All of these components are annular. As with O-rings 27 and 29, O-ring 54 preferably consists of synthetic rubber and provides a secondary seal.

Rotating seal ring 50 preferably consists of sintered silicon carbide, or other suitable material known in the art, chosen for its short lead time (i.e., time required to develop the rotor for use), low cost, and high strength to weight ratio.

Figure 4:
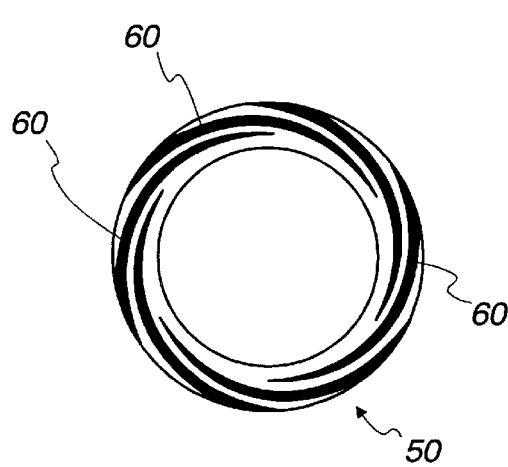
FIG. 4 is a plan view of a rotor sealing face used in a non-contacting bellows seal according to the present invention.

Rotating seal ring 50 has a sealing face opposing the sealing face of stationary seal ring 24. The rotating seal ring face includes spiral grooves 60 formed thereon, as shown in FIG. 4. Grooves 60 are preferably shallow, only approximately 0.06–0.07mm (0.0002–0.0003 inches) deep. The groove design, however, can be altered for a particular application. In addition, the grooves can be incorporated in the stationary seal ring face instead of the rotating seal ring face.

Grooves 60 provide both hydrostatic (i.e., non-rotating) and hydrodynamic (rotating) forces for separating the stator and rotor sealing faces. When rotating seal ring 50 is exposed to a pressurized gas, the gas enters the grooves 60 and provides an opening force. Typical separation between the seal faces under dynamic conditions is of the order of 50–200 $\mu$inches.

The inboard seal 14 is also a non-contacting seal consisting of a stationary assembly and a rotary assembly having similar components as outboard seal 12. The stationary assembly includes a stationary seal ring 70, a seal ring shell 71, an O-ring secondary seal 72, and a bellows 73. A damper strip 77 provides frictional damping of bellows 73.

Bellows 73 attaches to a drive collar 74 interlocked with a gland 75 which connects to housing 18. A sealing O-ring 76 is positioned between drive collar 74 and gland 75 and connects drive collar 74 to gland 75. O-ring 76 provides an inward radial force to retain drive collar 74 and permit its axial movement. Drive collar 74 includes a flange 104 extending radially outward from drive collar 74, as shown most clearly in FIGS. 2 and 3. A pin 106 connected to and extending from gland 75 prevents the rotation of drive collar 74.

The rotating assembly of inboard seal 14 includes a rotating seal ring 78 and an O-ring secondary seal 80 between seal ring 78 and the flange portion 57 of sleeve 23. Seal ring 78 has a sealing face opposing a sealing face of stationary seal ring 70. The face of rotating seal ring 78 includes spiral grooves for separating the sealing faces. In the alternative, as in the outboard seal, the face of stationary seal ring 70 may incorporate the spiral grooves.

Machine body 18, seal 10, and rotary sleeve 23 define three annular chambers. During operation, a first chamber 90 contains process fluid, while a second chamber 92 contains buffer fluid supplied from a port 94 of the adaptive housing 32. Preferably, the buffer fluid is a gas, most preferably an inert gas such as nitrogen. A third annular chamber 96 is open to the atmosphere and is defined by sleeve 23 and seal 12.

Initially, prior to operation, the sealing faces of both the inboard and outboard seals are contacting due to the mechanical spring force supplied by bellows 73 and 28 respectively. The spring force produces a low static face pressure to promote quick lift-off and minimizes wear should face contact occur at start-up and shut-down of rotation.

During operation and rotation of shaft 22, the buffer gas is supplied through port 94 to chamber 92. Under normal operation, the buffer gas is supplied at a pressure above atmospheric pressure and, preferably, at a pressure slightly higher than that of the process fluid to ensure no leakage of process fluid into chamber 92.

As shaft 22 rotates and spins rotating seal rings 50 and 78, and as gas pressure is applied to the chamber 92, gas flows into the grooves of rotating seal rings 50 and 78 and is pumped inward creating a high opening pressure. At both the inboard and outboard seals, the stator and rotor sealing faces separate and a thin film of gas forms therebetween. Thus, contact between the sealing faces and the generation of undesirable friction and heat are prevented during operation. Minimizing friction generated heat eliminates conditions leading to seal failure. Contact stress and wearing of seal faces is minimized. In addition, any thermal distortion of the sealing faces, which would otherwise cause them to improperly contact, will not affect seal life in a non-contacting seal.

Figure 2:
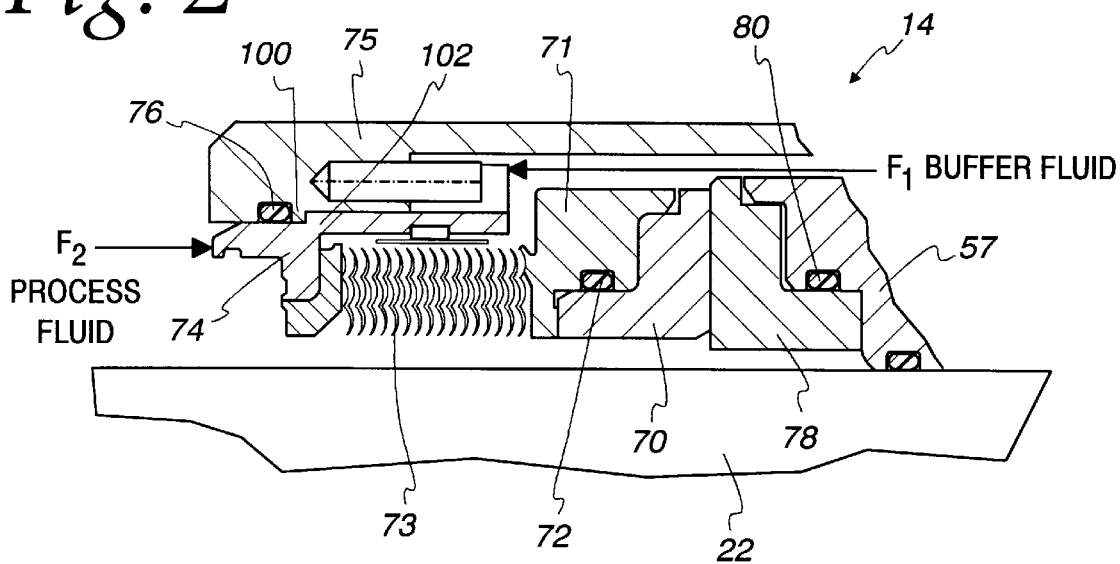
FIG. 2 is a cross-sectional diagram of the inboard seal of the FIG. 1 seal during normal operation.

FIG. 2 illustrates inboard seal 14 during normal operating conditions, i.e. the buffer gas pressure exceeds the process fluid pressure. Under these conditions, the process fluid applies a force $F_2$ to the back (inboard) side of drive collar 74 that is less than an opposing force $F_1$ applied to the outboard side of drive collar 74 by the buffer fluid. Because $F_1$ is greater than $F_2$, drive collar 74 is retained against gland 75, and flange 104 of drive collar 74 contacts gland 75. The contact force between flange 104 and gland 75 is the difference between $F_1$ and $F_2$. Gland 75 includes a stepped stop portion 100 against which an inclined raised portion 102 of drive collar 74 rests during normal operation. The mating of portions 100 and 102 prevents further movement of drive collar 74 to the left.

Figure 3:
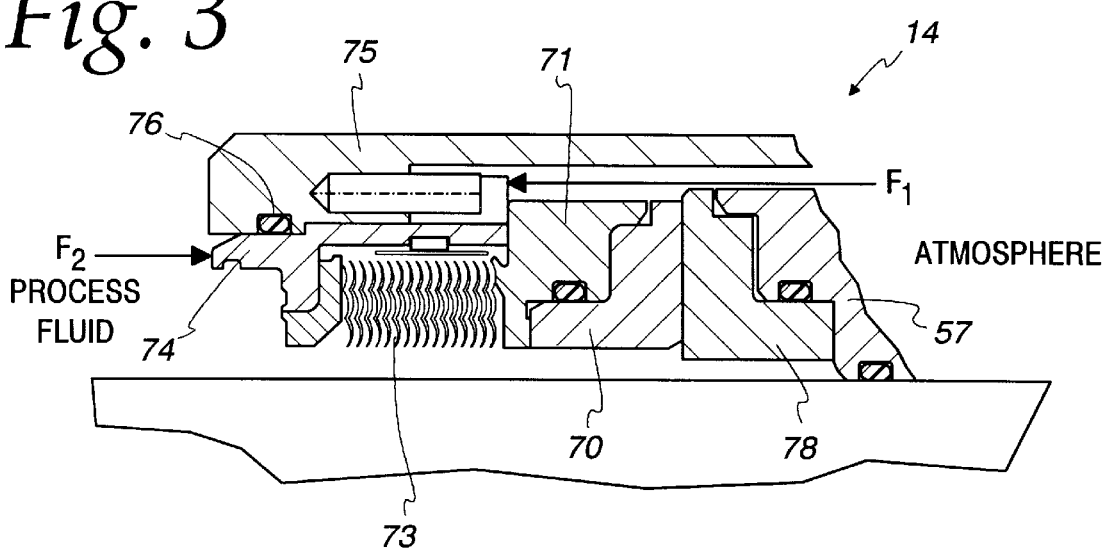
FIG. 3 is a cross-sectional diagram of the inboard seal of the FIG. 1 seal during reverse pressure conditions.

Should the seal 10 experience a sudden loss of buffer gas pressure so that the process fluid pressure exceeds the buffer fluid pressure, the force $F_1$ caused by the buffer fluid reduces to less than the force $F_2$ caused by the process fluid. FIG. 3 shows inboard seal 14 under this reverse pressure situation. Because $F_2$ is greater than $F_1$, drive collar 74 moves axially in the outboard direction, compressing bellows 73. This movement continues until drive collar 74 contacts the inboard face of seal ring shell 71. At this point, drive collar 74 exerts a relatively high control load on the sealing faces, maintaining the sealing relationship between the sealing faces and preventing any leakage of high pressure process fluid.

It will be apparent to those skilled in the art that various modifications and variations can be made to the seal of the present invention without departing from the scope or spirit of the invention. Thus, it is intended that the present invention cover the modifications and variations of this invention provided they come within the scope of the appended claims and their equivalents.

What is claimed is:

1. A seal for sealing a low pressure area from a high pressure area for containing a process fluid, the high pressure area located along a rotatable shaft extending from a machine body, the seal comprising:

an outboard seal positioned along the shaft;

an inboard seal axially spaced along the shaft from the outboard seal to define an annular chamber between the inboard seal and the outboard seal for containing a buffer fluid, the inboard seal including a stationary assembly attached to the machine body, the stationary assembly including a stationary seal ring having a stationary sealing face, a rotating assembly attached to the shaft, the rotating assembly including a rotating seal ring having a rotating sealing face in sealing relation with the stationary sealing face; and a drive collar positioned between the stationary assembly and the machine body, said drive collar being in sealing contact with said machine body, and including an O-ring for sealing between said drive collar and said machine body and for providing an inward radial force to retain the drive collar while permitting its axial movement, wherein the drive collar sealingly engages the machine body seal ring and said drive collar is spaced from the stationary assembly at an axially spaced position when the pressure of a buffer fluid in the annular chamber is greater than the pressure of process fluid in the high pressure area, and the drive collar contacts the stationary assembly at a contacting position to maintain the sealing relation of the rotating and stationary sealing faces when the buffer fluid pressure is less than the process fluid pressure, said drive collar being axially movable between said axially spaced position and said contacting position upon a change in the relative differential pressure of said process fluid and said buffer fluid.

2. The seal according to claim 1, wherein the drive collar is axially movable in the outboard direction when the process fluid pressure is greater than the buffer fluid pressure.

3. The seal according to claim 1, further comprising a bellows secondary seal between the stationary seal ring and the drive collar, the bellows compressing when the buffer fluid pressure is less than the process fluid pressure.

4. The seal according to claim 1, further comprising a secondary seal between the drive collar and the machine body.

5. The gas seal according to claim 1 wherein said stationary assembly further comprises a sealing shell, and said stationary secondary seal further comprises an O-ring for sealing between said sealing shell and said stationary seal ring, and wherein, at said contacting position, said drive collar contacts the stationary assembly at said sealing shell.

6. The inboard seal according to claim 1 wherein said stationary assembly further comprises a sealing shell attached to an end of said bellows closest to said stationary seal ring, and a second O-ring secondary seal is disposed for providing a seal between said sealing shell and said stationary seal ring.

7. A gas seal for use in connection with an outboard seal to seal a low pressure area from a high pressure area, the gas seal and the outboard seal being spaced along a rotatable shaft extending from a machine body to define an annular chamber between the gas seal and the outboard seal, the gas seal comprising:

a stationary assembly attached to the machine body, the stationary assembly including a stationary seal ring having a stationary sealing face and a stationary secondary seal for sealing between the stationary seal ring and at least one other element of the stationary assembly;

a rotary assembly attached to the rotatable shaft, the rotary assembly including a rotating seal ring having a rotating sealing face in sealing relation with the stationary sealing face and a rotating secondary seal for sealing between the rotating seal ring and the rotating assembly;

a drive collar positioned between the stationary assembly and the machine body, said drive collar being in sealing contact with said machine body, and including an O-ring for sealing between said drive collar and said machine body and for providing an inward radial force to retain said drive collar, the drive collar being axially movable depending on a change in differential of pressure of a process fluid in the high pressure area and pressure of a buffer fluid in the annular chamber; and a bellows secondary seal between the stationary seal ring and the drive collar, the bellows increasing in axial biasing force when the buffer fluid pressure is less than the process fluid pressure due to an increase in compression of said bellows.

8. The gas seal according to claim 7 wherein said at least one other element of said stationary assembly comprises a sealing shell, and said stationary secondary seal further comprises an O-ring for sealing between said sealing shell and said stationary seal ring.

9. The inboard seal according to claim 7 wherein said bellows secondary seal has a bellows mean diameter which is less than the sealing diameter of said O-ring.

10. The inboard seal according to claim 9 wherein said at least one other element of said stationary assembly further comprises a sealing shell attached to one end of said bellows closest to said stationary seal ring back face, and a second O-ring secondary seal is disposed for providing a seal between said sealing shell and said stationary seal ring.

11. The inboard seal according to claim 10 wherein said second O-ring secondary seal has a sealing diameter greater than the bellows mean diameter of said bellows secondary seal.

12. An inboard seal for use in connection with an outboard seal to seal a low pressure area from a high pressure area, the inboard seal and the outboard seal being spaced along a rotatable shaft extending from a machine body to define an annular chamber between the inboard seal and the outboard seal, the inboard seal comprising:

a stationary seal ring coupled to the machine body, the stationary seal ring having a stationary sealing face and a back face opposite from the stationary sealing face;

a rotating seal ring coupled to the rotatable shaft, the rotating seal ring having a rotating sealing face in sealing relation with the stationary sealing face; and a drive collar positioned between the stationary seal ring and the machine body for applying a contact force to the back face of the stationary seal ring so that the stationary and rotating sealing faces remain in sealing relation when pressure of a process fluid in the high pressure area is greater than pressure of a buffer fluid in the annular chamber, the drive collar including an O-ring having a predetermined sealing diameter, said O-ring providing a seal between an axially extending surface of said drive collar and said stationary machine body, said drive collar being axially movable along said O-ring depending on a differential of the process fluid pressure and the buffer fluid pressure; and;

a bellows secondary seal between the stationary seal ring and the drive collar, the bellows compressing when the buffer fluid pressure is less than the process fluid pressure.

13. The inboard seal according to claim 12 wherein said bellows secondary seal has a bellows mean diameter which is less than the sealing diameter of said O-ring.

14. The inboard seal according to claim 12 wherein said stationary assembly further comprises a sealing shell attached to an end of said bellows closest to said stationary seal ring, and a second O-ring secondary seal is disposed for providing a seal between said sealing shell and said stationary seal ring.

15. The inboard seal according to claim 13 wherein said stationary assembly further comprises a sealing shell attached to one end of said bellows closest to said stationary seal ring back face, and a second O-ring secondary seal is disposed for providing a seal between said sealing shell and said stationary seal ring.

16. The inboard seal according to claim 15 wherein said second O-ring secondary seal has a sealing diameter greater than the bellows mean diameter of said bellows secondary seal.

* * * * *

UNITED STATES PATENT AND TRADEMARK OFFICE
CERTIFICATE OF CORRECTION

PATENT NO.     : 5,954,341
DATED          : September 2, 1999
INVENTOR(S)    : Yoram Ringer et al.

It is certified that error appears in the above-identified patent and that said Letters Patent is hereby corrected as shown below:

Column 6,
Line 22, after "machine body" cancel "seal ring".

Signed and Sealed this

Second Day of October, 2001

Attest:

*Nicholas P. Godici*

NICHOLAS P. GODICI
*Acting Director of the United States Patent and Trademark Office*

*Attesting Officer*